(12) United States Patent
Beatty et al.

(10) Patent No.: US 8,373,316 B2
(45) Date of Patent: Feb. 12, 2013

(54) COOLANT FLOW ENHANCING DEVICE FOR STATOR COIL END TURNS OF FLUID COOLED ELECTRIC MOTOR

(75) Inventors: Reinhard Beatty, Blacksburg, VA (US); Ian Hovey, Christiansburg, VA (US)

(73) Assignee: Kollmorgen Corporation, Radford, VA (US)

( * ) Notice: Subject to any disclaimer, the term of this patent is extended or adjusted under 35 U.S.C. 154(b) by 213 days.

(21) Appl. No.: 13/005,010

(22) Filed: Jan. 12, 2011

(65) Prior Publication Data

US 2012/0175977 A1    Jul. 12, 2012

(51) Int. Cl.
*H02K 9/00* (2006.01)
(52) U.S. Cl. .............................. 310/54; 310/52
(58) Field of Classification Search ............... 310/52–59
See application file for complete search history.

(56) References Cited

U.S. PATENT DOCUMENTS

| | | | |
|---|---|---|---|
| 6,522,036 B1 | 2/2003 | Chen | |
| 6,713,927 B2 * | 3/2004 | Kikuchi et al. | 310/214 |
| 6,933,633 B2 | 8/2005 | Kaneko et al. | |
| 7,498,711 B2 * | 3/2009 | Biais | 310/214 |
| 7,538,457 B2 * | 5/2009 | Holmes et al. | 310/54 |
| 7,545,060 B2 * | 6/2009 | Ward | 310/54 |
| 7,737,586 B2 * | 6/2010 | Tounosu et al. | 310/61 |
| 8,129,873 B2 * | 3/2012 | Rai et al. | 310/53 |
| 8,134,261 B2 * | 3/2012 | Ikaheimo et al. | 310/62 |
| 2003/0062780 A1 * | 4/2003 | Kaneko et al. | 310/58 |
| 2007/0176499 A1 | 8/2007 | Holmes et al. | |
| 2008/0136271 A1 | 6/2008 | Alfermann et al. | |
| 2010/0001610 A1 | 1/2010 | Iki et al. | |
| 2011/0215661 A1 * | 9/2011 | Kabata et al. | 310/59 |

OTHER PUBLICATIONS

International Search Report dated May 16, 2012 (four (4) pages).
Written Opinion of the international Searching Authority, Form PC/ISA/237 (Jul. 2011) (four (4) pages).

* cited by examiner

*Primary Examiner* — Thanh Lam
(74) *Attorney, Agent, or Firm* — Crowell & Moring LLP

(57) ABSTRACT

A coolant flow enhancing device is provided to increase electric machine coil cooling at coil end turn locations. Such a device is incorporated into an overall fluid cooled electric machine that has phase separators extending through slots between stator teeth. The device includes flow deflectors located at ends of the phase separators. Each of the flow deflectors is designed so that a contour of its interior surface follows an outer contour of a corresponding one of the end turns to both maximize a cooling fluid flow rate past the one of the end turns and minimize separation of the fluid from the one of the end turns.

13 Claims, 3 Drawing Sheets

COOLANT FLOW ENHANCING DEVICE FOR STATOR COIL END TURNS OF FLUID COOLED ELECTRIC MOTOR

BACKGROUND OF THE INVENTION

1. Field of the Invention

This invention concerns an improved fluid cooling arrangement for an electric motor, generator, or motor/generator assembly. Such assemblies have numerous applications in a variety of fields, and are particularly useful in hybrid vehicle market applications. Use of the invention could occur, for example, in trucks, military vehicles, off-road vehicles, or other automotive vehicles.

2. Description of Related Art

U.S. Pat. No. 6,713,927 to Kikuchi et al, discloses a rotating electric machine using various regulating arrangements to increase cooling fluid flow speed through stator slots.

U.S. Pat. No. 6,933,633 to Kaneko et al. discloses a rotating electric machine having first cooling medium passages through stator slots and second cooling medium passages within an annular stator back core.

SUMMARY OF THE INVENTION

While testing an oil-cooled motor, it was found that the coil of wire wound around stator teeth operated cooler at locations near stator slot centers, where cooling fluid flow rate was high, than at coil end turn locations. It was recognized that a flow-directing device, providing a similarly high cooling fluid flow rate around the coil end turns, could serve to improve overall coil cooling and reduce temperature differentials within the coils.

By way of the present invention, a coolant flow enhancing device is provided to increase electric machine coil cooling at coil end turn locations. Such a device is incorporated into an overall fluid cooled electric machine that has a rotor on a rotor shaft, a stator surrounding the rotor, a plurality of stator teeth with slots between the stator teeth, and conductive wire coils wound around the stator teeth. Each of the conductive wire coils defines a pair of opposed end turns protruding beyond end openings of the adjacent slots, and phase separators extending through the slots between the stator teeth so that one of the phase separators is interposed between adjacent sections of the coils within each of the slots between the stator teeth.

The coolant flow enhancing device includes flow deflectors located at adjacent ends of the phase separators, in certain preferred embodiments, however, the flow deflectors are disposed at both opposite ends of the phase separators. Each of the flow defectors has an interior surface contour that follows an outer contour of a corresponding one of the end turns to both maximize a cooling fluid flow rate past the one of the end turns and minimize separation of the fluid flow from the one of the end turns. The phase separators may be composed of parts inserted into opposite ends of the slots and joined together.

At least one of the flow defectors may be formed integrally with one of the phase separators. In preferred configurations, each of the flow defectors, in a plan view, forms a section of an annulus. Cooling fluid, such as gear oil, is admitted to or discharged from between the flow deflector interior surface contour and the outer end turn contour by way of an opening defined between adjacent slots.

DETAILED DESCRIPTION OF THE INVENTION

Figure 1:
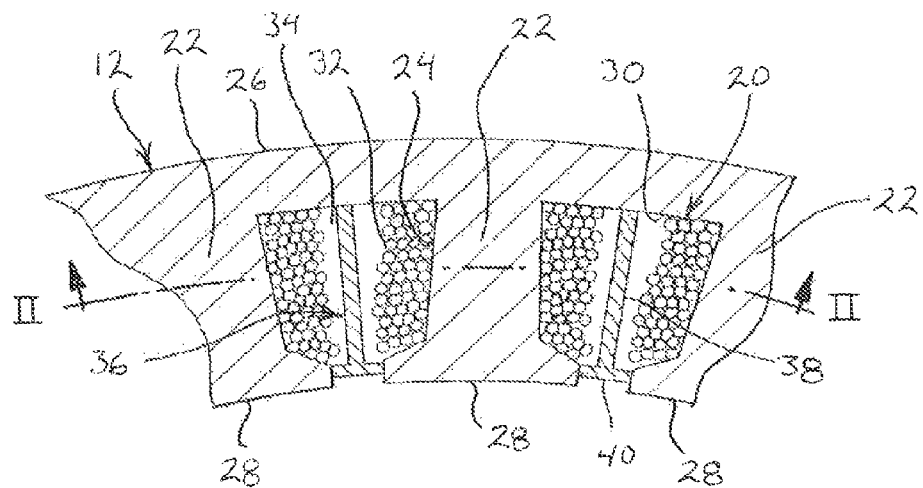
FIG. 1 is a sectional view, as seen along line I-I of FIG. 3, showing part of a stator, conductive wire windings, and phase separators according to the invention.

The view provided by FIG. 1 is analogous to the view provided by any of FIGS. 2-8 of U.S. Pat. No. 6,713,927 to Kikuchi et al. or by either FIGS. 3 or FIG. 4B of U.S. Pat. No. 6,933,633 to Kaneko et al. mentioned above, and provides a sectional end view of a part of a stator 12. The disclosures of both the Kikuchi et al. ('927) patent and the Kaneko et al. ('633) patent are incorporated herein by reference in their entireties as non-essential subject matter.

Figure 2:
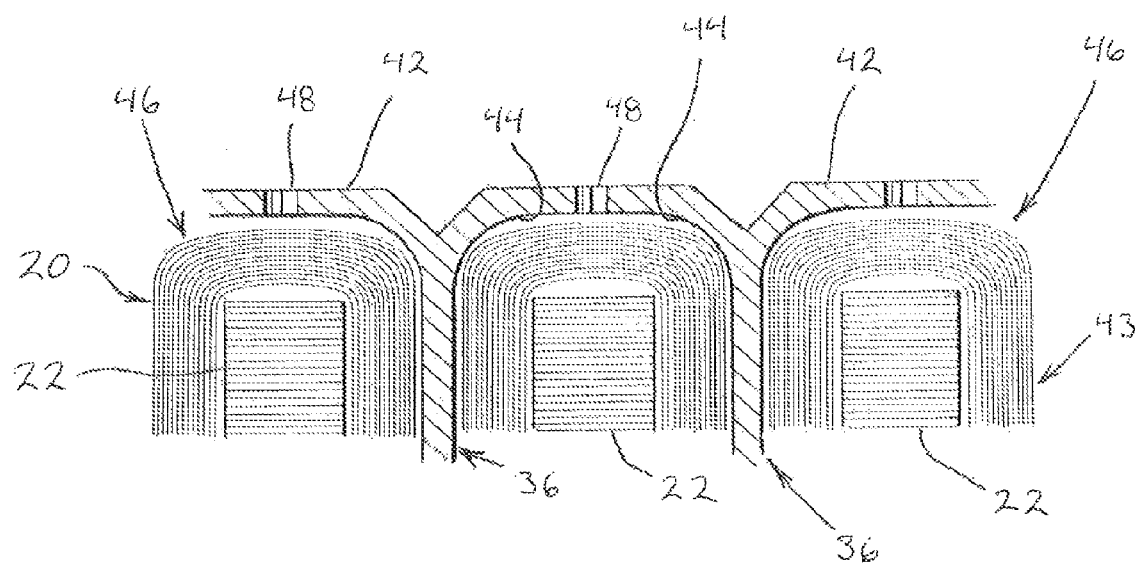
FIG. 2 is a sectional view of the arrangement shown in FIG. 1, as seen along line II-II, showing the manner in which the phase separators are configured to provide cooling fluid flow direction.
Figure 3:
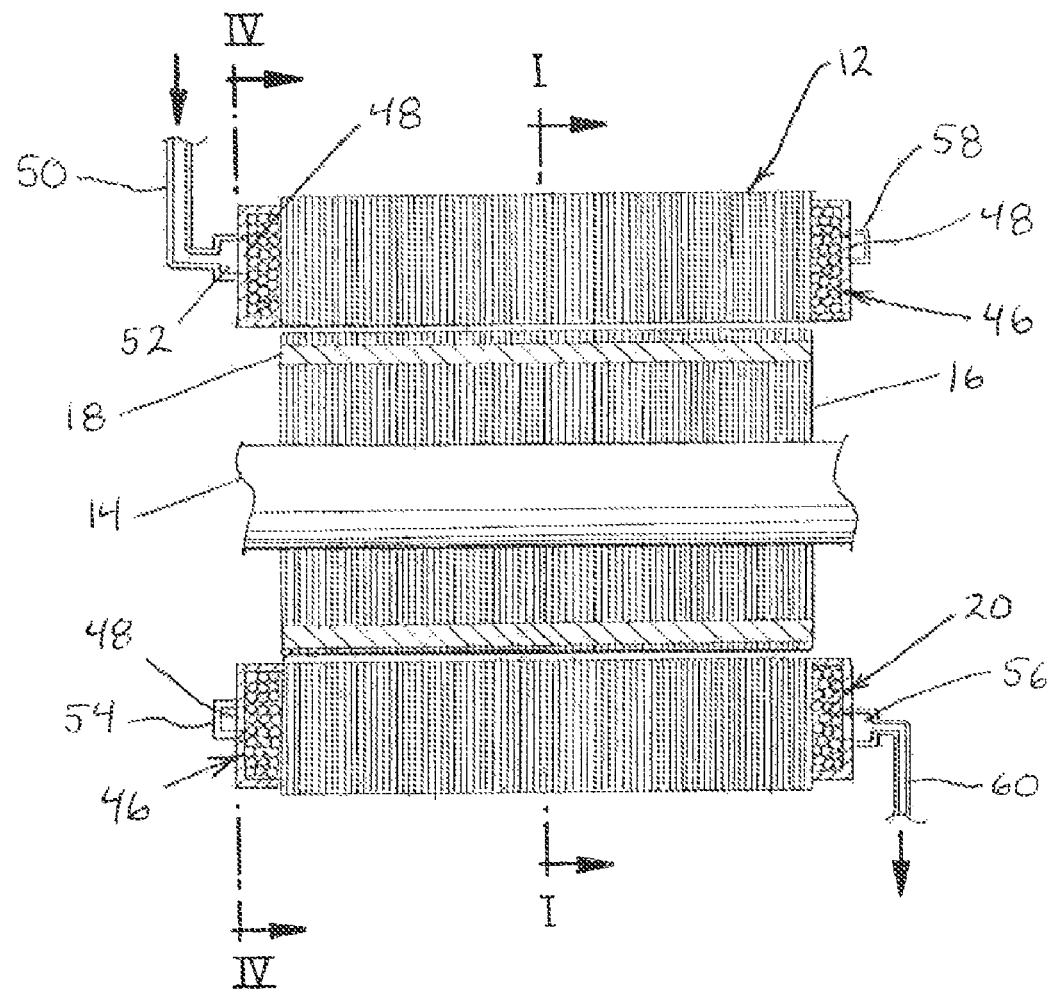
FIG. 3 is a sectional view as seen along line III-III in FIG. 4, of an overall motor, generator, or motor/generator assembly incorporating a cooling fluid flow guiding and restricting arrangement according to the invention.
Figure 4:
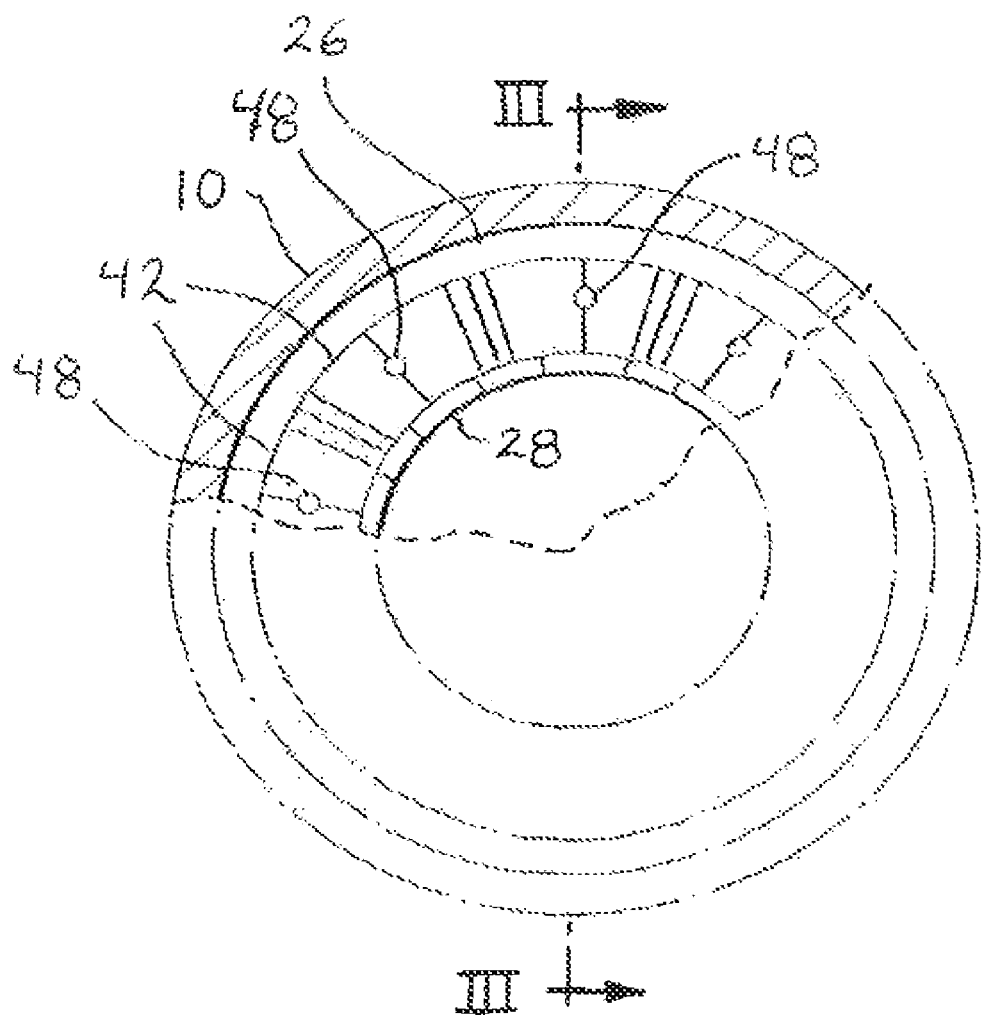
FIG. 4 is an end view of the overall assembly as seen along line IV-IV of FIG. 3.

FIG. 3 provides a longitudinal sectional illustration of an overall fluid cooled electric machine of the invention, which may be a motor, generator, or motor/generator assembly, while FIG. 4 is an end view of the assembly. FIG. 4 shows part of a cylindrical case 10 circumferentially surrounding the stator. The stator 12 may be press fit, glued, or secured in any other appropriate manner within the case 10, and typically is composed of a stack of iron alloy (steel), nickel alloy, or cobalt alloy sheet laminations bonded or secured together in a known manner. FIG. 3 also illustrates part of a rotor shaft 14 on which a rotor 16, with permanent magnets 18 appropriately distributed therein, is secured for rotation together with the shaft 14, as well as conductive wire coils 20 that are wound around radially inwardly projecting stator teeth 22, best seen in FIGS. 1 and 2, in a conventional manner.

As seen in FIG. 1, each of the stator teeth 22 has a radially extending section 24 extending radially inwardly from a cylindrical outer base 26, and terminates in a flanged or circumferentially expanded, radially interior end 28 to define slots 30 between adjacent teeth 22. Accordingly, as seen in the view provided by FIG. 1, each tooth is provided with an approximately T-shaped cross section. Conductive wire 32 is wound around and carried by each tooth 22 in a conventional manner to form the coils 20.

After each stator tooth 22 is provided with the desired number of conductive wire winding's, spaces or voids 34 remain between adjacent windings of the wire 32. As described in the Kikuchi et al. (927) patent, for example it is known to utilize these spaces or voids 34 as cooling passages for gear oil or another such cooling medium when operating the overall electric machine assembly as a motor, generator, or motor/generator.

A non-conductive phase separator 36 is incorporated into each slot 30 as shown in FIG. 1, and is configured to define an approximately flat wall 38 located within the slot 30 to separate and electrically isolate neighboring coils of wire 32 in the slot. By way of example only, and without limiting the invention in any way, twelve slots 30 may be distributed around a central stator axis, and each of these twelve slots would receive one of twelve phase separators 36. Each separator wall 38, as shown, terminates at one end in a phase separator base 40 dimensioned to close off the space defined between radially interior ends 28 of adjacent stator teeth 22. The other end of each flat wall 38 abuts the circumferential interior wall of the stator base 26. Each phase separator 36 may be dimensioned so as to be retained by a press fit within a slot 30, or may be retained within that slot in any other suitable manner.

According to the present invention, each phase separator 36 is also configured to cooperate with adjacent phase separators 36 to provide a flow-directing feature, by which a flow of typically liquid coolant is directed or forced over end-turns of the coils of conductive wire 32. As best shown in FIG. 2, in one preferred embodiment, the flow-directing feature is produced by flow deflectors 42 formed on opposite ends of the phase separators 36. These flow deflectors 42 consist of wings configured to overlie the end turns of the coils, and direct coolant so that the coolant remains close to all surfaces of the coil, providing greatly improved cooling capability. Providing the wings assists in obtaining maximum power from an electric machine with little effect on machine size and weight. When no phase separators are used, the flow deflectors 42 may be secured directly to the ends of the stator 12.

The interior surfaces 44 of the wings 42 closely follow the outer contours of the conductive winding end turns, generally indicated by reference number 46 in FIG. 2. Each of the conductive wire coils 20, it will be understood, includes a pair of primary coil sections 43, passing through adjacent stator slots 30, and a pair of the end turns 46, which protrude beyond the ends of the stator slots. The wings 42 operate both to avoid separation of coolant flow from the end turns 46, so that the coolant remains engaged with the end turns, and to provide a high flow rate of coolant over the end turns 46 of the coils by reducing the cross-sectional area of coolant flow. Coolant is admitted into the volumes existing between the end turns 46 and the interior surfaces 44 through openings 48 forming coolant flow apertures or orifices provided between otherwise-abutting surfaces of adjacent wings 42. Without this wing structure, the cooling fluid flow rate over each end turn 46 would be much lower than over the wires of the coils 20 in the cooling passage spaces or voids 34 of each slot, where the space for oil or other fluid to flow is typically restricted already. The wings 42, accordingly, serve to greatly enhance cooling effectiveness. Adjacent sets of wings 42 thus define non-conductive flow-directing devices having openings 48 allowing entry of coolant in proximity to a coil end turn 46. The adjacent wing sets combine to form an interior surface contour that hugs the outer contour of each coil end turn 46.

The wings 42 provide coolant flow paths between their interior surfaces 44 and the end turns 46 of the coils and, subsequently, into openings of slots 30. When the flow-directing device is integrated with a phase separator as shown in FIG. 2, to assemble the integrated flow deflector and phase separator, a pair of phase separator halves are inserted into each slot 30, with one phase separator half being introduced into the slot 30 from each axial end of the slot between adjacent teeth 22. After the phase separator halves are fully received within respective slots and secured in place, complete separation of coils 20 within each of the slots results. The flow deflectors at opposing ends of each assembled phase separator define restricted gaps between the wing interior surfaces 44 and the coil end turns 46. These restricted gaps cause the flow rate of coolant to be increased, thus increasing the convective coefficient, and, hence, the heat transfer capability of the coolant. This, in turn, results in a motor, a generator, or a motor/generator with greater heat rejection capability.

One possible arrangement by which oil or another such cooling medium can be supplied to the openings 48, and thus to the coolant flow volume in proximity to a coil end turn 46, is shown in FIG. 3. Coolant may be fed, for example, by a coolant supply conduit 50 into a reservoir 52, located over the openings 48, past the coil end turns 46 wrapping around first ends of the stator teeth 22, and then into first end openings of the stator slots 30. In the particular arrangement shown, the openings 48 are arranged approximately in a circle, as illustrated in FIG. 4, and the reservoir 52 is defined by a sealed ring 54 overlying the openings. FIG. 4 also shows the wings associated with each phase separator as forming a section of an annulus in plan view. After passing through the slots 30, coolant may be discharged through second end openings of the slots 30, past the coil end turns 46 wrapping around second ends of the stator teeth 22 opposite the first ends mentioned above, and then into another reservoir 56 defined by a sealed ring 58 that, again, overlies openings 48 arranged at the coolant discharge end of the arrangement. Coolant may then be discharged by way of a coolant discharge conduit 60.

It is to be understood that ways other than the integrated phase separator and flow guiding and restricting arrangement described could be used to guide and restrict coolant flow over the coil end turns and improve cooling effectiveness. As one example of another arrangement, a molded plastic ring could include the flow-deflecting features described above for each coil, and could be mounted adjacent to each end turn of the motor.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A fluid cooled electric machine comprising:
a rotor disposed on a rotor shaft,
a stator surrounding the rotor and having a plurality of radially inwardly protruding stator teeth and slots between the stator teeth,
conductive coils wound around the stator teeth, each of said conductive coils defining a pair of primary coil sections passing through adjacent slots between the stator teeth and a pair of opposed end turns protruding beyond end openings of the adjacent slots, and
flow deflectors surrounding each coil end turn, each of the flow deflectors having an interior surface contour that follows an outer contour of a corresponding one of the end turns to both maximize a cooling fluid flow rate past the one of the end turns and minimize separation of the fluid flow from the one of the end turns.

2. A fluid cooled electric machine according to claim 1, further comprising phase separators extending through said slots between the stator teeth, one of the phase separators interposed between adjacent primary coil sections within each of said slots.

3. The fluid cooled electric machine according to claim 2, wherein at least one of the flow deflectors is formed integrally with one of the phase separators.

4. The fluid cooled electric machine according to claim 1, wherein each of said flow detectors, in a plan view, forms a section of an annulus.

5. The fluid cooled electric machine according to claim 1, wherein cooling fluid is admitted to or discharged from between the interior surface contour and the outer end turn contour by way of an opening defined between adjacent stator slots.

6. The fluid cooled electric machine according to claim 1, wherein the flow deflectors are located at both opposite ends of the conductor coils.

7. The fluid cooled electric machine according to claim 2, wherein the phase separators are composed of parts inserted into opposite ends of the slots and joined together.

8. The fluid cooled electric machine according to claim 2, wherein cooling fluid is admitted to or discharged from between the interior surface contour and the outer end turn contour by way of an opening defined between adjacent stator slots.

9. The fluid cooled electric machine according to claim 3, wherein cooling fluid is admitted to or discharged from between the interior surface contour and the outer end turn contour by way of an opening defined between adjacent stator slots.

10. The fluid cooled electric machine according to claim 6, wherein cooling fluid is admitted to or discharged from between the interior surface contour and the outer end turn contour by way of an opening defined between adjacent stator slots.

11. The fluid cooled electric machine according to claim 7, wherein cooling fluid is admitted to or discharged from between the interior surface contour and the outer end turn contour by way of an opening defined between adjacent stator slots.

12. The fluid cooled electric machine according to claim 2, wherein the phase separators are composed of parts inserted into opposite ends of the slots and made to overlap one another.

13. The fluid cooled electric machine according to claim 2, wherein the phase separators are composed of parts inserted into opposite ends of the slots and located with a gap between them.

\* \* \* \* \*